United States Patent [19]
Kirma

[11] Patent Number: 5,619,015
[45] Date of Patent: Apr. 8, 1997

[54] ELECTRICAL CABLE WITH A BEND RETAINING JACKET CAPABLE OF CONFORMING TO A SUBSTANTIAL INSTALLATION CURVE

[75] Inventor: Safa Kirma, Wedel, Germany

[73] Assignee: Daimler-Benz Aerospace Airbus GmbH, Hamburg, Germany

[21] Appl. No.: 505,688

[22] Filed: Jul. 21, 1995

[30] Foreign Application Priority Data

Jul. 21, 1994 [DE] Germany .......................... 44 25 867.4

[51] Int. Cl.$^6$ ..................................... H01R 9/07
[52] U.S. Cl. ..................... 174/84 R; 174/126.3; 439/578; 439/579; 439/584
[58] Field of Search ............................ 174/128.1, 126.3, 174/84 R; 439/578, 579, 581, 584

[56] References Cited

U.S. PATENT DOCUMENTS

| | | | |
|---|---|---|---|
| 3,453,377 | 7/1969 | Gillespie | 174/75 X |
| 4,156,554 | 5/1979 | Aujla | 339/177 R X |
| 5,024,606 | 6/1991 | Ming-Hwa | 439/578 |
| 5,466,173 | 11/1995 | Down | 439/584 |

FOREIGN PATENT DOCUMENTS

| | | | |
|---|---|---|---|
| 2503471 | 11/1975 | Germany . | |
| 3914930 | 10/1990 | Germany . | |
| 3914933 | 10/1990 | Germany | 174/84 R |
| 9401199 U | 5/1994 | Germany . | |

Primary Examiner—Kristine L. Kincaid
Assistant Examiner—Chau N. Nguyen
Attorney, Agent, or Firm—W. G. Fasse; W. F. Fasse

[57] ABSTRACT

A cable end with its terminal or connector is maintained in a curved installed position with the aid of a bent retaining jacket (25A). The jacket is preferably a corrugated metal hose having one end formed into a bushing that is clamped in place on a support body of the connector or terminal together with other cable components such as a protective hose system. The bend maintaining jacket has an inner diameter that is larger than the outer diameter of the protection hose system of the cable so that the jacket may be freely pushed over the cable end prior to the installation of the terminal or connector. The opposite end of the jacket remains open or rather unconnected, thus enabling the jacket to accommodate any twists that result from bending the cable end. Although the jacket is bendable, it has a bend retaining characteristic that will not change its curved configuration in response to impacts, vibrations, or the like. Only an intentional renewed bending can bring the jacket into a new curved shape.

13 Claims, 1 Drawing Sheet

ELECTRICAL CABLE WITH A BEND RETAINING JACKET CAPABLE OF CONFORMING TO A SUBSTANTIAL INSTALLATION CURVE

CROSS-REFERENCE TO RELATED APPLICATION

The present application is related to my copending, commonly assigned application U.S. Ser. No.: 08/505,082, filed Jul. 21, 1995, (Attorney Docket No.: 3211), and entitled ELECTRICAL AND MECHANICAL CABLE CONNECTOR PERMITTING RELATIVE ROTATION BETWEEN CONNECTOR COMPONENTS.

FIELD OF THE INVENTION

The invention relates to a cable construction especially for use in an aircraft. The cable construction is adapted for installation along substantial curves, for example a 180° turn with an ability to retain the curve under all operating conditions.

BACKGROUND INFORMATION

The construction and installation of electrical conductors such as cables which may contain one or more electrical conductors with their terminals or connectors and with their junctions, must be done so that, especially in an aircraft, all kinds of loads can be taken up, such as mechanical loads, thermal loads, electrical loads and chemical exposures. For this purpose it is known to install electrical cable connections in an aircraft or at least at certain locations within an aircraft in metal protector casings. These casings protect the cable inside the casing against mechanical influences and/or against electro-magnetic disturbances, especially against the adverse influence of excess voltages or currents caused by lightning. In an aircraft it is necessary to install such protector casings and their connections in such a way that the respective cable can be connected to a large number of densely packed electrical equipment components or groups of such components. Additionally, these components are supplied with rather different types of useful signals and have different sensitivities regarding adverse influences such as the effects of lightning. Conventional installations of this type cannot be installed in a minimal space with variable directions of the extension of these cables for connection to electrical and/or mechanical terminal components inside the aircraft body. Further, once conventional cables with their protector casings are installed, they have a tendency to not retain the installed curved or bent configuration especially if the cables are stiff.

German Patent Publication DE-PS 3,914,930 C1 (Kirma) published on Oct. 25, 1990, discloses a device for protecting individual electrical conductors by enclosure in a protective corrugated hose which is effective against excess voltages as may occur due to lightning impact in an aircraft. The device includes a plug connector having a straight configuration. The corrugated hose is made of metal and functions as a protector casing fixed to the end of the housing of the plug connector. Any directional change of the cable toward the plug connector is accomplished with the help of two half shells which are rigid and capable only of accommodating a right-angle bend in the cable. Such a connection element or connector does not permit any installation of electrically insulated conductors that must be bent for connection to an electrical component in an aircraft. Any bend made is not stiff against bending unless the above mentioned two-half shells are used which have, as mentioned, the limitation disadvantage that they can accommodate only a 90° bend.

German Patent Publication DE-OS 2,503,471 (Francois) published on Nov. 13, 1975 discloses a coupling for flexible conduits of synthetic or elastic material such as a hose for a flowing medium or for an electrical conductor. The coupling has a hexagonal head having nipple type extensions on both sides and a seal between the coupling and the conduit. The seal is accomplished by pressing the end of the conduit with a coupling nut against the coupling member. A stuffing seal is provided between the coupling nut and the respective coupling extension. The stuffing seal also facilitates the mounting of the conduit hose on the coupling extension. The known connection does not realize a permanent mechanical shape-retaining bend. The hoses are too flexible for a retaining of a bend once formed. Thus, the known construction is not suitable for use in a hose system that needs to be installed in an aircraft with a substantial curve that, once installed, must retain its curved configuration.

German Utility Model Publication GE-UM G 94 01 199.0 (Sihn, Jr.) published on May 5, 1994 relates to a coaxial cable fitting for connecting a coaxial cable to a housing. The housing has a connector bushing with an inner threading. The fitting has an outer conductor bushing with a device for holding the coaxial cable in the outer conductor bushing which has an outer threading for cooperation with the inner threading of the housing connector bushing. The device for holding the cable is a shrinkable hose and the mentioned outer threading is part of a section rotatably connected to the outer conductor bushing. A contact spring is provided between the outer conductor bushing and the threaded bushing section. This known construction also does not provide the bendability of the cable nor any capability of retaining a bend in its curved configuration once the bend has been formed.

OBJECTS OF THE INVENTION

In view of the above it is the aim of the invention to achieve the following objects singly or in combination:

- to provide a cable with a jacket, such as a corrugated metal hose section capable of conforming to substantial installation curves in an aircraft in such a manner that once a substantial curve, for example of 180°, has been formed that curve will be retained in its configuration after installation;
- a protective hose system although part of the cable, shall not form part of an outer bendable, yet shape retaining jacket section; and
- to provide a bendable outer jacket section that is suitable for cooperation or combination with various types of cable structures for the purpose of forming shape-retaining bends in the cable structures, whereby such bends shall be able to assume any degree of bending even exceeding 180°.

SUMMARY OF THE INVENTION

The invention combines the following features in a cable construction. A cable with one or more electrical conductors is enclosed in a protective hose system. The cable with its protective hose system is in turn enclosed in a bend maintaining metal jacket or casing which is preferably a metal corrugated hose capable of being bent, but also able to retain its curvature once bent. The cable is connected to a terminal or connector comprising a hollow cylindrical threaded member such as a coupling nut retained on a hollow cylindrical body so that the coupling nut is rotatable relative to the support body. The support body has a first large diameter section and a second smaller diameter section. The sections are interconnected with each other to form a single piece structure with a shoulder between the sections. The protective hose system comprises an electrically conducting hose such as a metal webbing surrounding the small diameter section of the support body. The conducting hose in turn is surrounded coaxially by an insulating hose preferably made of a synthetic material webbing. The bend maintaining jacket has a flat smooth end that additionally may have axial slots in a bushing that surrounds coaxially the insulating hose. The flat smooth end of the bend maintaining jacket, the electrically conducting hose, and the electrically insulating hose are tied to the small diameter section of the support body by a clamping element such as hose clamp or pinch sleeve or tension band.

The invention achieves the following advantages. A form-fit or location fit connection is provided between the bend maintaining jacket and the cable with its protective hose system. Thus, once the cable is installed in a curve, it will stay in the required curved shape with the aid of the jacket. By leaving the other end of the bend maintaining jacket unattached and free, it is possible to use the present device for cables with any type of protective hose system that needs to be installed in a curved, yet bending stiff manner. Once the bend is established, it can only be disturbed by an intentional renewed bending for removal out of the bent position and into another bent position. Thus, during flight, the installed bent position of cables according to the invention are not disturbed by possible influences such as mechanical loads in the form of landing shocks, vibrations, or rather loads. It is now also possible to install the bend maintaining jacket on installed cables with any type of protective hose system to thereby retrofit the existing cable installations with bend retaining jackets without any substantial effort and expense. Since the bend retaining jacket does not become part of the protective hose system and since one end of the bend retaining jacket remains free, the installation is possible as long as the outer diameter of the protective hose system is smaller than the inner diameter of the bend retaining jacket which serves only as a bend retainer at a cable end.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
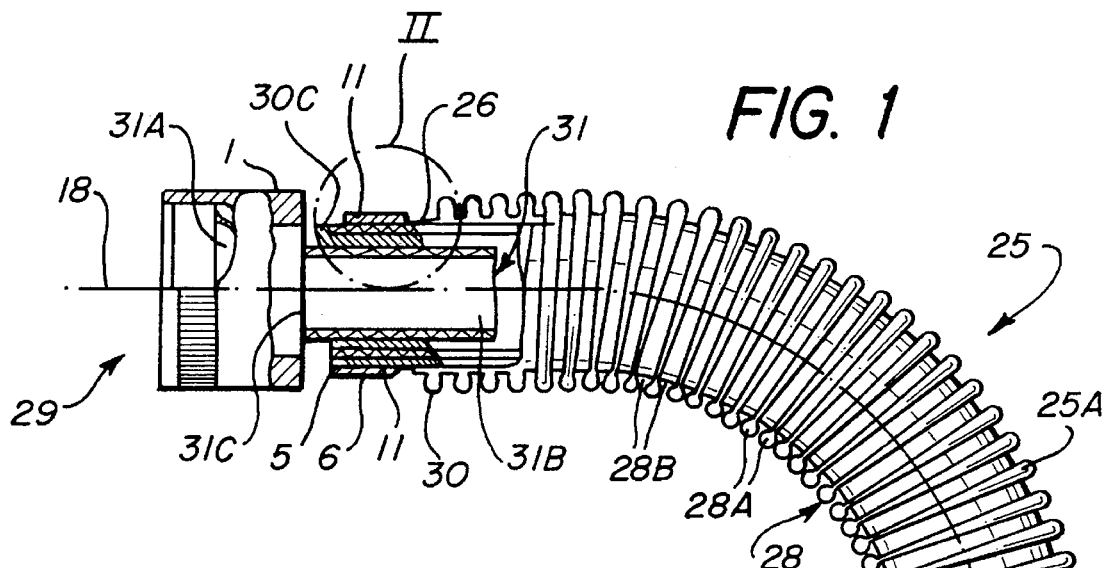
FIG. 1 shows a 180° bend in a cable end with a bend retaining jacket according to the invention, whereby one end of the jacket remains free and the other end is connected to a cable terminal or coupling device.

FIG. 1 shows a cable end 25 of a cable C provided with a bend retaining jacket 25A, preferably in the form of a corrugated metal hose in which the corrugations either are arranged as a helix of ridges and valleys or the ridges and valleys form interconnected closed rings. The bend maintaining jacket 25A has a smooth flat end 26 forming a substantially cylindrical bushing 27, shown in FIG. 2, that may be axially slotted for easy connection to a cable connector or terminal 29 as will be described in more detail below. The bend maintaining jacket 25A further has a free end 26A that is not connected to the cable C which has a protective hose system 5, 6, 6A with an outer diameter that is smaller than the inner diameter of the jacket 25A. The cable end 26A is free, but the jacket 25A is nevertheless able to maintain end 25 of the cable in the bent position once the jacket 25A has been bent to form the curve, for example a curve of more than 180° as shown in FIG. 1. The inner curve 28 with a radius R of the jacket 25A is formed because the ridges 28A of the corrugations are displaced somewhat radially inwardly of the curve 28 while the ridges 28B are displaced somewhat radially outwardly relative to the curve 28.

The terminal or connector element 29 comprises, for example, a hollow cylindrical coupling nut with an internal threading retained in a rotatable manner on a hollow cylindrical support body 31 arranged coaxially to the coupling nut 1, as is described in more detail in the above cross-referenced application. The support body 31 has two sections, namely a large diameter section 31A and a small diameter section 31B interconnected by a shoulder 31C to form an integral one-piece structure. The coupling nut 1 has a hole through which a small diameter section 31B of the support body 1 extends in a rotatable manner. The coupling nut 1 is restrained against axial displacement relative to the support body 31 by, for example, a spring ring or a flange not shown.

As is conventional, the inner threading of the coupling nut 1 can engage an outer threading of a cooperating coupler, for example connected to a housing not shown. The support body 31 has a stop member not shown, but engaging the coupler in a fully connected condition to prevent relative rotation between the coupler and the support body 31 of the connector coupling nut 1. Electrical conductors 8 of the cable C are connected to pins or sockets of conventional construction not shown. The cable C passes through the hollow inner diameter of the small diameter section 31B of the support body 31. The connector 29 and its connection to the conductors 8 of the cable C is conventional.

A metal bushing 30 having a first axial section 30A that is circumferentially uninterrupted and a second axial section 30B that is circumferentially interrupted by axial slots is rotatably positioned on the smaller diameter section 31B of the support body 31. The bushing 30 further has a radially extending flange 30C facing the coupling nut 1. The bushing 30 and the support body 31 are axially restrained relative to each other by a further spring ring 32 which permits relative rotation between the bushing 30 and the support body 31B. The slotted section 30B of the bushing 30 comprises a plurality of flexible elements constructed as contact springs which are circumferentially spaced from each other by axially extending slots but interconnected by the bushing section 30A. These contact springs of the bushing section 30B are biased radially inwardly to bear with a radially inward pressure against the radially outer surface of the small diameter section 31B of the support body 31, whereby a good electrical contact is established between the bushing 30 and the support body 31. The electrically conducting spring ring 32 positioned in respective grooves in the body 31 and the bushing 30 also enhances the electrical contact between the bushing 30 and the body 31. In order to provide a sufficient cross-sectional electrical conductor area for the dissipation of excess electrical currents that may result due to lightning, the contact springs 30B forming part of the slotted bushing section are closely spaced from one another circumferentially in contact with the outer surface of the support body section 31B. These contact springs or contact tongues formed by the section 30B are biased by an inherent spring characteristic against the surface of the support body section 31B to establish the required electrical contact.

Figure 2:
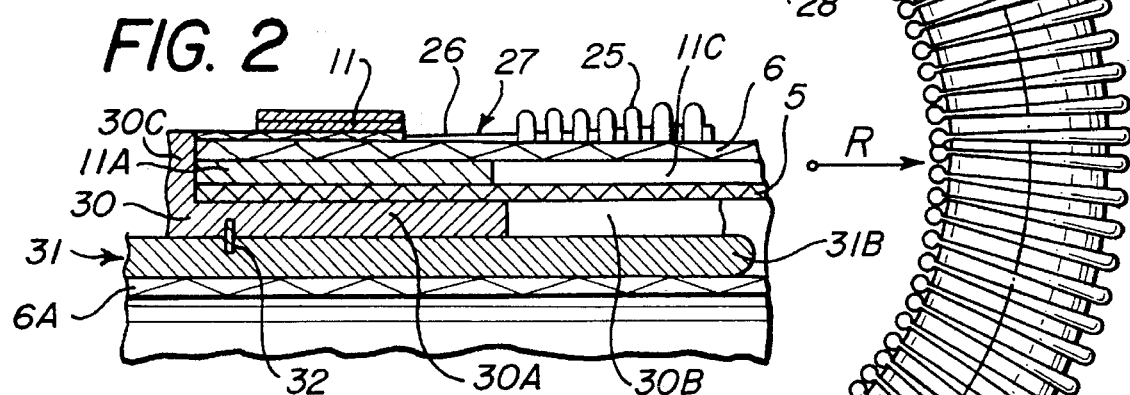
FIG. 2 is a sectional view on an enlarged scale of the detail II in FIG. 1.

Referring further to FIG. 2 the bushing 30 is surrounded by the protective hose system 5, 6 of the cable C. First, an electrical conducting hose 5 surrounds the bushing 30. The hose 5 is preferably made of a copper webbing. An electrically insulating hose 6 surrounds coaxially the copper webbing to protect the latter against frictional rubbing or chafing.

The bend maintaining jacket 25A forms with its smooth, not corrugated end 26 that may additionally be axially slotted, the above mentioned bushing 27 that abuts against the flange 30C. The bushing 27 coaxially surrounds the insulator hose 6. Preferably, the left-hand ends of the bushing 27, of the insulator hose 6, and of the electrically conducting hose 5 abut against the flange 30C, as best seen in FIG. 2, which also shows that the small diameter section 31B of the support body 31 surrounds a further electrically nonconducting hose 6A also preferably made of rubber or synthetic material such as a synthetic material webbing. The insulating hose 6A in turn surrounds electrical conductors 8 that are individually insulated as is conventional to protect the conductors 8 against chafing.

A clamping element 11 such as a pinch sleeve, hose clamp, tension tape or the like secures the above described components to each other. Preferably, a further clamp 11A is interposed between the insulator hose 6 and the conducting hose 5 as best seen in FIG. 2. The intermediate clamp 11A such as a pinch sleeve secures the electrically conducting hose 5 on the solid, uninterrupted section 30A of the bushing 30. Since the bushing 30 is rotatable relative to the support body 31 and since the electrical conductor hose 5 is tightly secured to the bushing 30 it becomes possible to compensate for any twisting forces that may occur as a result of the bending of the bend maintaining jacket 25A.

It is not absolutely necessary to provide the bushing 30. In such a modification without the bushing 30 the ends of the hoses 5 and 6 and the bushing 27 may be directly clamped to the small diameter section 31B of the support body 31. However, even in this embodiment it is desirable to provide the intermediate clamp 11A for example in the form of a pinch sleeve in the position shown in FIG. 2.

In another alternative embodiment the bushing 30 is retained, but the spring ring 32 is omitted. In these embodiments either without a bushing or without the spring ring 32, but with the bushing, the relative rotatability described above with reference to FIGS. 1 and 2 is not maintained. However, even in these modifications the bendability and bend retaining ability of the jacket 25A are not diminished. Thus, the jacket 25A can be bent into a curved configuration even larger than 180° and it will retain the bent condition in a bending stiff manner even if the jacket 25A is not only bent in a plane, but also three dimensionally, for example as a helix. Very little space is needed for such bending.

The coupling nut 1, the support body 31, the two mentioned spring rings, one of which is shown at 32, the bushing 30, and the housing of the connector to which the coupling nut 1 is screwed and the clamp 11 are made of metal that is a good electrical conductor since these components are integrated into an overload protection circuit which is grounded to the metal structure of an aircraft body to dissipate electromagnetic disturbances such as excess voltages or currents caused by lightning. The jacket 25A is also made, as mentioned, of metal, but it is not normally integrated into the overload protection circuit due to the insulating hose 6. However, the metal jacket 25A may be integrated into the overload protection circuit of the aircraft. For this purpose the free end 26A that is not secured to the bushing 30 is connected in an electrically conducting manner to the overload protection circuit. In the embodiment of FIG. 1, the free end 26A of the jacket 25A remains unconnected which has the advantage that the jacket 25A may be combined with any protection hose system of a cable provided the above mentioned condition is met that the outer cable diameter is smaller than the inner diameter of the jacket 25A. In any of these installations, the jacket 25A is so constructed that it is bendable but, once bent, will retain its bent configuration even if the curvature is a full circle of 360°. Once bent, the jacket 25A will not change its bent configuration even when mechanical loads such as impacts, vibrations, or other loads occur during the operation of the aircraft. Only an intentional further mechanical bending will make it possible to change the curvature of the bend. Thus, the installation can be changed depending on the requirements inside an aircraft, especially depending on the available space for bending the jacket 25A in a plane or three-dimensionally in space. In all of these installation situations the jacket 25A will retain its bent configuration.

When the jacket 25A is removed for any reason, the electrical overload protection is not influenced thereby unless the jacket 25A was integrated into the overload protection circuit. Normally that will not be the case and the electrical connection between the electrically conducting hose 5 and the metal bushing 30 with the clamp or pinch sleeve 11A provides the required electrical conduction from the support body 31 to the grounding or overload protection circuit which thus remains functional even if the jacket 25A is removed. Leaving the end 26A free makes the jacket 25A adaptable to any type of cable provided the above mentioned conditions are met, whereby the relative rotation between the bushing 30 and the support body 31 as permitted by the ring 32 provides the additional advantageous adaptability of the jacket 25A to the particular installation condition because any twists are automatically compensated. Further, the terminal connector 29 as shown or conventional cable connectors, junctions, and the like may be used in combination with the present teaching.

Referring further to FIG. 2, the use of the intermediate pinch sleeve 11A has the advantage that the electrical contact between the electrically conducting hose 5 and the bushing section 30A is improved.

Figure 3:
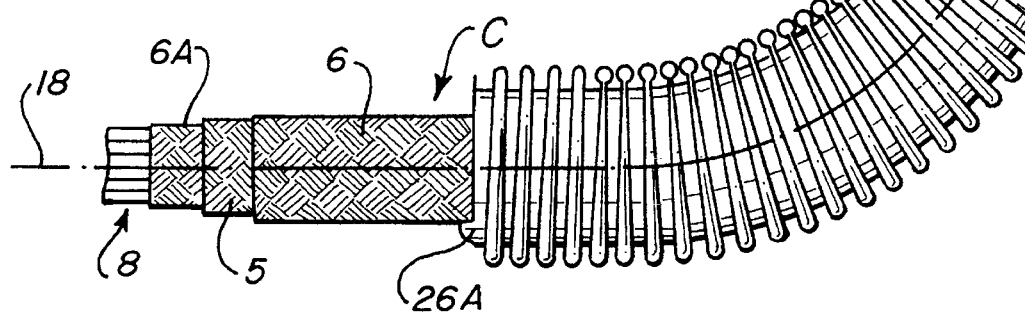
FIG. 3 is a view similar to that of FIG. 2, however showing a modified construction of the connection of the bend retaining jacket to the cable end.
Figure 3:
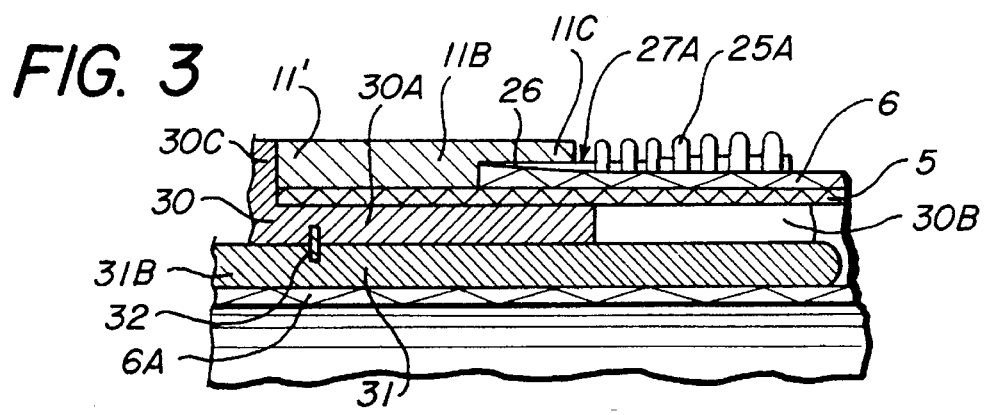

The modification shown in FIG. 3 omits the intermediate clamp 11A. Additionally, the end 26 that forms the cylindrical or slotted bushing 27A of the corrugated metal jacket 25A and the left-hand end of the electrically insulating hose 6 are axially spaced away from the flange 30C of the bushing 30 so that a clamp 11' fits into the space formed by the just mentioned spacing. A clamp section 11B ties the left-hand end of the conducting hose 5 to the bushing section 30A while a clamp section 11C ties the bushing 27A of the jacket 25A and the left-hand end of the insulator hose 6 through the conductor hose 5 to the bushing sections 30A and 30B. The clamp 11' is preferably a pinch sleeve that secures all mentioned components through the bushing section 30A to the small diameter section 31B of the support body 31. The spring ring 32 again permits the compensation of any twists that may occur when the cable end with its jacket 25A is bent.

Although the invention has been described with reference to specific example embodiments, it will be appreciated that it is intended to cover all modifications and equivalents within the scope of the appended claims.

What is claimed is:

1. An electrical cable for installation in an aircraft, comprising one or more electrical conductors (8), a connector (29) electrically connected to said conductors (8), a protective hose system (5, 6, 6A) enclosing said conductors (8), a bend maintaining jacket (25A) surrounding said protective hose system (5, 6, 6A) along at least part of said electrical cable, a support body (31) and at least one clamping device (11) cooperating in securing said protective hose system (5, 6, 6A) and said bend maintaining jacket (25A) to said connector (29), said support body (31) having a large diameter section (31A), a small diameter section (31B) and a shoulder (31C) interconnecting said large and small diameter sections (31A, 31B), said protective hose system comprising an electrical conducting hose (5) made of a metal-webbing having an end surrounding said small diameter section (31B) and an electrical insulating hose (6) made of a synthetic material webbing, said bend maintaining jacket (25A) having a first end formed as an end bushing (27) coaxially surrounding said insulating hose (6), said at least one clamping device (11) securing ends of said hoses (5, 6) and said end bushing (27) to said small diameter section (31B), whereby said jacket (25A) maintains any bend in said at least part of said electrical cable.

2. The electrical cable of claim 1, wherein said end bushing (27) of said first end (26) of said bend maintaining jacket (25A) is a cylinder (27) having a smooth, not corrugated surface.

3. The electrical cable of claim 2, wherein said cylinder (27) has at least one slot extending axially.

4. The electrical cable of claim 1, further comprising a metal bushing (30) coaxially seated on said small diameter section (31B) of said support body (31), said metal bushing (30) comprising a first solid axial section (30A) and a second slotted axial section (30B) forming electrical contact springs elastically biased into contact with said body small diameter section (31B), said metal bushing (30) further comprising a radially extending flange (30C) facing said shoulder (31C) of said support body (31), said electrical conducting hose (5) having an end abutting said flange (30C), said insulating hose (6) having an end abutting said flange (30C), said end bushing (27) of said jacket (25A) also abutting said flange (30C), and wherein said at least one clamping device (11) fixes said abutting ends and said end bushing (27) in place.

5. The electrical cable of claim 4, further comprising a spring ring (32) axially interlocking said metal bushing (30) and said small diameter section (31B) of said support body while permitting a relative rotation between said support body and said metal bushing (30).

6. The electrical cable of claim 1, further comprising an additional clamp (11A) in the form of a pinch sleeve between said electrical conducting hose (5) and said electrical insulating hose (6).

7. The electrical cable of claim 6, wherein said pinch sleeve comprises a solid pinching section (11A) and an axial, slotted extension (11C) forming electrical contacts coaxially enveloping said electrical conducting hose (5).

8. The electrical cable of claim 7, further comprising between said support body (31) and said electrical conducting hose (5) a metal bushing (30) with a radial flange (30C), and wherein said solid pinching section of said clamp (11A) abuts against said radial flange (30C).

9. The electrical cable of claim 1, further comprising a metal bushing (30) with a radial flange (30C) and an axial section (30A) between said small diameter section (31B) of said support body (31) and said electrical conducting hose (5), and wherein said end bushing (27) of said bend maintaining jacket (25A) and said insulating hose (6) are axially spaced from said radial flange (30C) to provide an axial spacing between said radial flange (30C) and said end bushing (27) and between said radial flange and an axial end of said insulating hose (6), said at least one clamping device (11) comprising a first section (11B) positioned in said axial spacing in contact with said electrical conducting hose (5) and a second section (11C) away from said flange in contact with said end bushing (27) to thereby clamp said end bushing (27) and said axial end of said insulating hose (6) to said small diameter section (31B) of said support body (31).

10. The electrical cable of claim 9, further comprising a spring ring (32) axially interlocking said metal bushing (30) and said small diameter section (31B) of said support body (31) while permitting a relative rotation between said support body and said metal bushing (30).

11. The electrical cable of claim 1, wherein said bend maintaining jacket (25A) comprises a second end (26A) which is not connected to said cable thereby permitting a free movement of said jacket (25A) in response to bending of said cable.

12. The electrical cable of claim 1, wherein said protective hose system ( 5, 6, 6A) of said cable has an outer diameter smaller than an inner diameter of said bend maintaining jacket (25A).

13. The electrical cable of claim 1, wherein said bend maintaining jacket (25A) is a corrugated metal hose.

* * * * *